United States Patent [19]

Guyer et al.

[11] Patent Number: 4,989,781
[45] Date of Patent: Feb. 5, 1991

[54] HIGH-EFFICIENCY HEATING UNIT

[75] Inventors: Eric C. Guyer, Dover, Mass.; Martin K. Gollin, St. Davids, Pa.

[73] Assignees: H. B. Smith Co., Westfield, Mass.; Dunkirk Radiator Corp., Dunkirk, N.Y.

[21] Appl. No.: 478,128

[22] Filed: Feb. 6, 1990

[51] Int. Cl.⁵ .............................................. F24D 3/00
[52] U.S. Cl. .................................. 237/56; 126/116 R
[58] Field of Search ................. 237/50, 53, 19, 8 R, 237/56; 126/113, 116, 112; 122/20 B

[56] References Cited

U.S. PATENT DOCUMENTS 2,609,797  9/1952  Blizard .
3,896,992  7/1975  Borovina et al. .
4,136,731  1/1979  DeBoer .
4,175,518  11/1979 Reames, Jr. .
4,344,568  8/1982  Stewart et al. .
4,362,129  12/1982 Banfi et al. .
4,651,923  3/1987  Ben-Samuel et al. ................. 237/53

FOREIGN PATENT DOCUMENTS 901247   3/1985  Belgium .
192502   8/1986  European Pat. Off. .
192506   8/1986  European Pat. Off. .
2103510  2/1983  United Kingdom .

Primary Examiner—Henry A. Bennet
Attorney, Agent, or Firm—Nutter, McClennen & Fish

[57] ABSTRACT

A forced hot-water heating system in which sensible and latent heat remaining in flue gases after contact with a primary heat exchanger is recycled into incoming cold air by a second heat exchanger. The heater, humidified intake air is then directed to a fuel burner, and reduces the amount of fuel necessary to achieve a given amount of heat exchange at the primary heat exchanger at normal operating return-water temperatures.

9 Claims, 1 Drawing Sheet

HIGH-EFFICIENCY HEATING UNIT

BACKGROUND OF THE INVENTION

1. Field of the Invention

The present invention relates generally to the field of hot-water space heating systems, and in particular to a system that recaptures heat contained in exhaust vapor.

2. Description of the Related Art

Due to the high cost of fuel, a strong economic incentive exists to maximize the efficiency of space heating systems. The water vapor produced by the gas or fuel burners employed in typical systems provides a major pathway for energy loss due to the high heat capacity and heat of vaporization of water. Although water vapor is a significant combustion product in these systems, it escapes as flue gas in conventional recirculatory heating systems because the heat exchangers respond primarily to the sensible heat of the burners; therefore, the heated water vapor can contribute only minimally to reheating of the incoming heat transfer medium. Indeed, it has been found that the water vapor in typical flue gas represents approximately 10% of the total available heat from combustion.

An ideal system for reclaiming this energy would cool the water vapor to condensation, thereby capturing the bulk of the heat stored in the vapor. However, practical constraints limit the feasibility of designing such systems. Depending on the amount of excess air used in combustion, the water-vapor dew point of methane or natural gas combustion products ranges from about 120° F. to 138° F. Cooling the flue gas below this temperature range may be practical in a forced-air heating system, where the temperature of the heat transfer medium (heated air) is only about 70° F. However, such cooling is impractical in the case of traditional forced hot-water heating systems. The water-supply temperature in such systems can exceed 200° F., while return water temperatures generally exceed 145° F. and can reach about 180° F.

Colder return temperatures in forced hot-water systems can theoretically be achieved by reducing the water flow rate, so that heat exchange at the building radiators is allowed to progress further. However, flow rates sufficiently slow to reduce return temperatures below the flue gas dew point would result in poor heat delivery through conventional radiators. Similarly, reduction of the supply water temperature would substantially reduce the heating capacity of the system.

One feasible approach to energy recapture in forced hot-water water heating system involves transferring both sensible and latent heat contained in the flue gas to the incoming air stream, rather than to the supply or return water. The resultant introduction at the point of combustion of air having elevated temperature and water-vapor levels reduces the amount of fuel necessary to achieve a given net heating duty, and increases the temperature at which heat exchange from the condensation of water vapor can be achieved. Such systems have been known in the prior art for some time; see, e.g., U.S. Pat. No. 1,291,175 (issued Jan. 14, 1919, and hereinafter referred to as the "'175 Patent"); U.K. Patent No. 2,103,510 (hereinafter referred to as the "'510 Patent"). However, these prior art systems present a number of disadvantages. Multiple pumps and/or elevational requirements for the secondary heat exchanger limit the net energy recovery, as well as causing significant practical constraints on the efficient and economic arrangements of system components. Furthermore, the designs of the secondary heat exchangers found in the prior art exhibit undesirable thermodynamic characteristics and require flow and liquid-level balancing components that further degrade performance.

DESCRIPTION OF THE INVENTION

Brief Summary of the Invention

The present invention overcomes the limitations associated with prior art systems by utilizing a self-balancing, closed-system design that operates with a single pump, and a highly efficient secondary heat exchanger. The system comprises a fuel burner, a primary heat exchanger, a secondary (or recuperative) heat exchanger, an evaporative water cooler/air heater located at the combustion air intake, and various accessory components. The system is configured such that a large fraction of the sensible and latent heat remaining in exhaust gases after contact with the primary heat exchanger is recycled into incoming cold air by the combination of the second heat exchanger and evaporative water cooler/air heater.

Ambient air, the temperature of which is augmented as described below, is conducted to the burner. The burner mixes the intake air with gaseous or liquid fuel, and ignites the mixture. The products of combustion, having elevated temperature, pass through the primary heat exchanger. In this scheme, the heat of the combustion products is transferred to a circulating water loop that distributes heated water to radiators located within the space to be heated. The combustion gases exit from the primary heat exchanger at a temperature near that of the circulating water returning to the primary heat exchanger. These gases then enter the secondary heat exchanger.

In the present invention, the secondary heat exchanger is a part of a second water loop that circulates only within the heating unit. Combustion gas is further cooled by the secondary heat exchanger to a temperature below its dew point, thereby extracting the latent heat of vaporization and producing water condensate. Cooling of the combustion gas results in heating of the water of the second water loop that circulates through the secondary heat exchanger. The condensed water from the combustion gas settles and is collected in the system sump, while the remaining gaseous products of combustion are exhaused from the system.

The water loop of the second heat exchanger flows to an evaporative water cooler/air heater located at the combustion air intake of the system. The evaporative water cooler/air heater disperses the heated water and directs it against the incoming air flow. Upon making intimate contact with the incoming air stream, some of the water emerging from the second water loop evaporates, thereby cooling the remaining, unevaporated water; this unevaporated water, which constitutes a significant portion of the inlet flow, settles in the system sump. The air leaving the evaporative water cooler/air heater exists at an elevated temperature and humidity, and is transferred to the burner to facilitate combustion.

The water from the sump, representing water collected from condensation around the second heat exchanger and from the evaporative cooler, is pumpted in a continuous fashion through the second heat exchanger. The water loss from the second water loop that is produced by evaporation is more than balanced by the gain of water from condensation at the second heat exchanger, and a drain may be provided to prevent excess buildup in the sump.

DESCRIPTION OF THE PREFERRED EMBODIMENT

Figure 1:
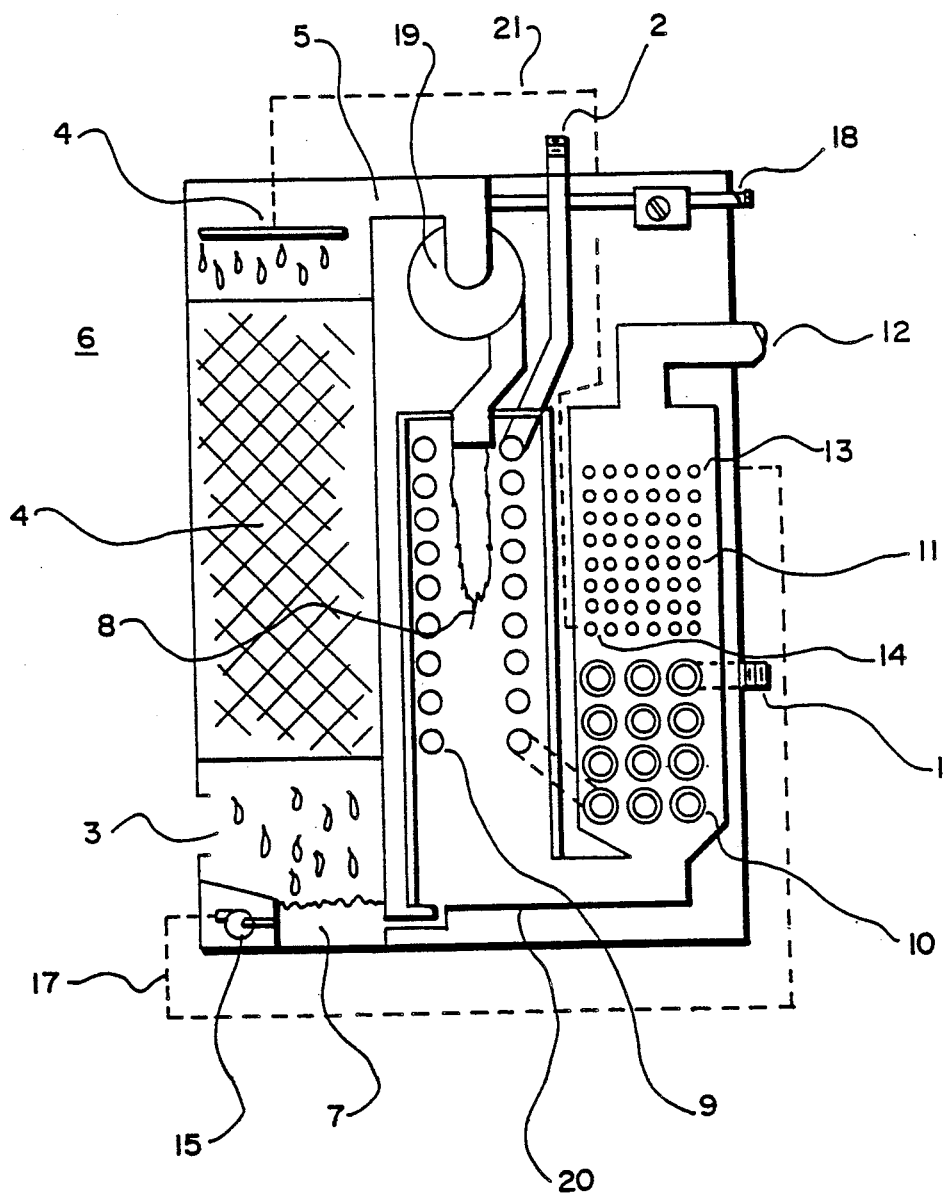

The foregoing and other and further features and objects of the invention will be understood more readily from the following detailed description of the invention, when taken in conjunction with the single figure of the drawing, which shows a schematic view of the preferred embodiment.

As illustrated in FIG. 1, the first water loop consists of inlet 1, which accepts incoming return water from radiators located throughout the space to be heated; primary heat exchanger components 9 and 10; and outlet 2, which directs heated supply water back to the space-heating radiators. The pumping apparatus responsible for circulating the water throughout the first water loop is not shown.

Heat exchanger components 9 and 10 should provide sufficient contact area between the water and combustion products to facilitate heat transfer, while maintaining a physical barrier therebetween. Components 9 and 10 may take the form of a single unit composed of any cast or fabricated material suitable for use in a fired water heater. A set of continuous passages, such as would be provided by a length of coiled tubing, provides the simplest configuration meeting these requirements.

The second water loop consists of sump pump 15, which forces water collected in sump 7 through line 17 (depicted as a dashed line for illustrative clarity); heat exchanger 11, which receives water from line 17 at inlet 13; and line 21, which guides water from heat exchanger 11 to evaporative water cooler/air heater 4. Heat exchanger 11 may usefully consist of any material suitable for use in a condensing flue-gas environment and that provides a physical separation (but good thermal contact) between the water and the cumbustion products. Again, a set of continuous passages such as that provided by a length of coiled tubing provides a convenient configuration. After making contact throughout water cooler/air heater 4 with air entering at inlet 3, the unevaporated water settles into and is collected in sump 7. Depending on the relative rates of evaporation and collection, it may be useful to equip sump 7 with a drain to relieve the system of excess water buildup. It is also desirable to choose coils for heat exchanger 11 that are of smaller diameter than those of heat exchange sections 9 and 10 in order to maximize contact surface area and achieve design compactness. Flow rates through the secondary heat exchanger can be smaller than those of the primary heat exchanger, permitting relatively smaller flow passages in the former without significant pumping head.

Evaporative water cooler/air heater 4 operates by providing a relatively large surface area for contact between the water, which is drawn downward by gravity, and incoming air drawn upward by blower 19. Such direct-contact heat exchange may be achieved by a number of means well-known in the art. One suitable type of evaporative water cooler/air heater, known as a "packed-bed", direct-contact heat exchange column, comprises a vertical column in which packing material is distributed. The packing material enhances the surface area of contact between the cascading water and counterflowing air.

Incoming air entering at inlet 3 makes contact with heated water of the second water loop in evaporative water cooler/air heater 4, and thereafter passes through duct 5. Fuel is introduced into duct 5 from fuel supply 18. The air/fuel mixture enters blower 19 which forcibly directs the mixture to burner 6 where combustion occurs. Flame 8 directly heats passage section 9 of the primary heat exchanger. Combustion products from flame 8 pass through the remainder of primary heat-exchanger section 9, then through section 10, followed by passage through secondary heat exchanger 11. Finally, the combustion products are exhaused from the system as flue gas through outlet 12.

Condensate forming as a result of contact with heat-exchanger section 9, 10 and 11 collects in drain pan 20, which drains to sump 7 of the secondary water system. Depending on the temperature of the water returning at inlet 1 to heat-exchanger section 10, condensation of flue gas may first occur along primary heat-exchanger section 10. Acidic components of flue gas tend to condense more easily than other components, and may therefore constitute only a small fraction of the water vapor reaching secondary heat exchanger 11. Because secondary heat exchanger 11 is disposed above primary heat-exchanger section 10, the water condensing at secondary heat exchanger 11 may be less corrosive than that which had previously condensed below, and thereby provide a backwashing function as this water is directed over heat-exchanger components 10 and 11. Backwashing would be expected to retard corrosion of these components.

This configuration results in several additional advantages over systems found in the prior art. The systems disclosed in the '175 and '510 Patents rely on direct-contact heating means both at the intake stage (where air is heated by water) and the recuperative heat exchange stage (where water is heated by gas). With this type of heat-exchange mechanism at the recuperative stage, heat transfer is thermodynamically limited because the heated gas cannot elevate the temperature of the water above its own wet-bulb temperature. Utilizing the heat exchanger of the present invention, which physically separates the gas and water, this limitation is avoided. Thus, water passing through coil 10 may be heated to a temperature greater than the wet-bulb temperature of the combustion gas. This higher temperature limit facilitates greater flexibility with respect to selection of the economically optimal thermodynamic break point between the primary and secondary heat exchangers.

The coil-type heat exchangers used in one embodiment of the recuperative component of the present invention also result in less gas-flow pressure loss than that experienced with the direct-contact type heat exchangers found in the prior art. Reduced pressure loss results in lower fan power requirements, and thus less consumption of electricity.

Further efficiency is gained by use of a single pump, resulting in reduced energy consumption by the present invention when compared tothe first design disclosed in the '510 Patent. Furthermore, both the '510 and '175 Patents contemplate downward, gravity-driven cascades of water to facilitate counterflow heat exchange. This design imposes both elevation and orientation constraints, since the heat-exchange conduit must be vertical and of sufficient length to yield the desired energy transfer. The present invention utilizes a single evaporative heat exchanger, and is therefore is restricted as to height and orientation only with respect to this unit, which can be physically separated from the remainder of the system.

The two-pump system of the '510 Patent also requires a balancing pipe "[t]o prevent water column head differences or to balance the liquids on the bases [.]" See page 2, col. 1, lines 47-48 of the '510 Patent. This connection between two sumps, one containing relatively hot pre-transfer liquid and the other containing relatively cool post-transfer liquid, necessarily degrades the thermal efficiency of the system. The present invention is self-balancing with respect to flow rates, and sump 7 collects only post-transfer liquid from which heat has been absorbed.

The designs disclosed in the '510 and '175 Patents are open-loop systems, with the result that the pumping head is dictated by the elevation of the water discharge at the top of the unit. The present invention is largely closed-loop, with the exception of evaporative water cooler/air heater 4. This design offers a reduced pumping head due to greater static head pressure recovery; the necessary pump power is prescribed only by internal flow friction plus the elevation of evaporative water cooler/air heater 4. Although it would be possible to use a coil-type heat exchanger in lieu of evaporative water cooler/air heater 4, as suggested in U.S. Pat. No. 4,344,568, the surface area offered by a coil is limited in its usefulness in heating an oncoming stream of air by the evaporative cooling of water, since an independent means of keeping the surfaces wet is required. Maintaining uniform wettedness is widely regarded in the art as a practical design difficulty. By contrast, a coil-type heat exchanger is perfectly adequate for transferring heat from a condensing, moisture-laden gaseous source to a flowing liquid, as is the case in the secondary heat exchanger of the present invention.

Accordingly, it will be seen that the present invention offers a number of advantages over the prior art. It is well-suited for use with traditional forced hot-water heating systems; as noted hereinabove, such systems typically employ water-supply temperatures to as much as 200° F. or more, and return water temperatures of up to about 180° F. While conventional fired water-heating units cannot benefit from the high efficiency of condensing heat-transfer operations with return temperature greater than about 120° F., the present invention allows such heat transfer, with its attendant benefits, at return temperatures normally associated with such conventional heating units.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A self-balancing, forced hot-water heating system wherein sensible and latent heat from exhaust gases is recycled into incoming air, said system comprising:
   a. a burner for burning fuel in a stream of incoming air;
   b. a first heat exchanger for transferring heat from the combustion products of said burner to a water loop circulating through the space to be heated;
   c. a second heat exchanger disposed downstream from said first heat exchanger with respect to the flow of said combustion products, for transferring additional heat from said combustion products to a second water loop while maintaining a physical barrier therebetween;
   d. evaporative air-heating and water-cooling means for transferring heat from said second water loop to the incoming air;
   e. means for conducting the incoming air from said evaporative water-cooling and air-heating means to said burner;
   f. a sump for collecting unevaporated water from said evaporative water-cooling and air-heating means; and
   g. pumping means for directing water from said sump to said second heat-exchange means and thence to said evaporative water-cooling and air-heating means.

2. The heating system of claim 1 wherein said first heat exchanger comprises at least one set of passages through which said first water loop flows and said second heat exchanger comprises a single set of passages through which said second water loop flows.

3. The heating system of claim 2 wherein the diameter of the passages of said first heat exchanger is larger than the diameter of the passages of said second heat exchanger.

4. The heating system of claim 1 further comprising air-moving means for causing air to flow into a through said evaporative air-heating and water-cooling means, to and through said burner, to and through said first and second heat exchangers, and to an exhaust.

5. The heating system of claim 4 wherein said air-moving means is an air blower located at any position in the flow stream commencing at an intake leading to said evaporative air-heating and water-cooling means and terminating at said exhaust.

6. The heating system of claim 1 wherein said second heat exchanger is disposed above said first heat exchanger at the point where said first heat exchanger receives return water from said first water loop.

7. The heating system of claim 1 wherein said sump also collects condensate from said first and second heat exchangers.

8. The heating system of claim 1 wherein said evaporative air-heating and water-cooling means is a direct-contact, packed-bed heat exchange column.

9. The heating system of claim 1 wherein the return water temperature of said water loop is above 140° F.

* * * * *